United States Patent
Worrell et al.

[19]

[11] Patent Number: 6,076,425
[45] Date of Patent: Jun. 20, 2000

[54] STEERING COLUMN FOR MOTOR VEHICLE

[75] Inventors: Barry Christian Worrell, Centerville, Ohio; Jeffery L. Caudle, Grand Blanc, Mich.

[73] Assignee: General Motors Corporation, Detroit, Mich.

[21] Appl. No.: 09/106,218

[22] Filed: Jun. 25, 1998

[51] Int. Cl.[7] .............................. B62D 1/04; G05G 1/10
[52] U.S. Cl. ............................. 74/552; 74/591; 74/548; 403/379.6; 403/379.4; 411/338
[58] Field of Search .......................... 74/491, 492, 543, 74/548, 552; 403/379.6, 379.4, 379.1; 411/338, 339

[56] References Cited

U.S. PATENT DOCUMENTS

| | | | |
|---|---|---|---|
| 4,299,138 | 11/1981 | Sjöqvist | 74/552 |
| 4,481,838 | 11/1984 | Findley et al. | 74/493 |
| 5,398,568 | 3/1995 | Worrell et al. | 74/552 |
| 5,941,131 | 8/1999 | Föhl | 74/552 |

*Primary Examiner*—David M. Fenstermacher
*Attorney, Agent, or Firm*—Kathryn A. Marra

[57] ABSTRACT

A motor vehicle steering column including a steering shaft, a steering hand wheel, and an attachment between the steering shaft and the steering hand wheel. The attachment includes a cone-shaped outside shoulder on the steering shaft, a cone-shaped inside shoulder in a bore in a hub of the steering hand wheel, a retaining nut on on the steering shaft, and a plurality of outside spline teeth on the steering shaft in mesh with a plurality of inside spline teeth in the bore in the hub of the steering hand wheel. Two of the inside spline teeth are merged to define a double-wide blocked tooth. One of the outside spline teeth is eliminated to define a substantially double-wide longitudinal blocked tooth groove. The blocked tooth has a lip extending beyond the ends of the inside spline teeth which seats on and slides over the ends of the outside spline teeth until the blocked tooth registers with the blocked tooth groove. The lip separates the ends of the inside and the outside spline teeth until the blocked tooth is aligned with the blocked tooth groove.

2 Claims, 2 Drawing Sheets

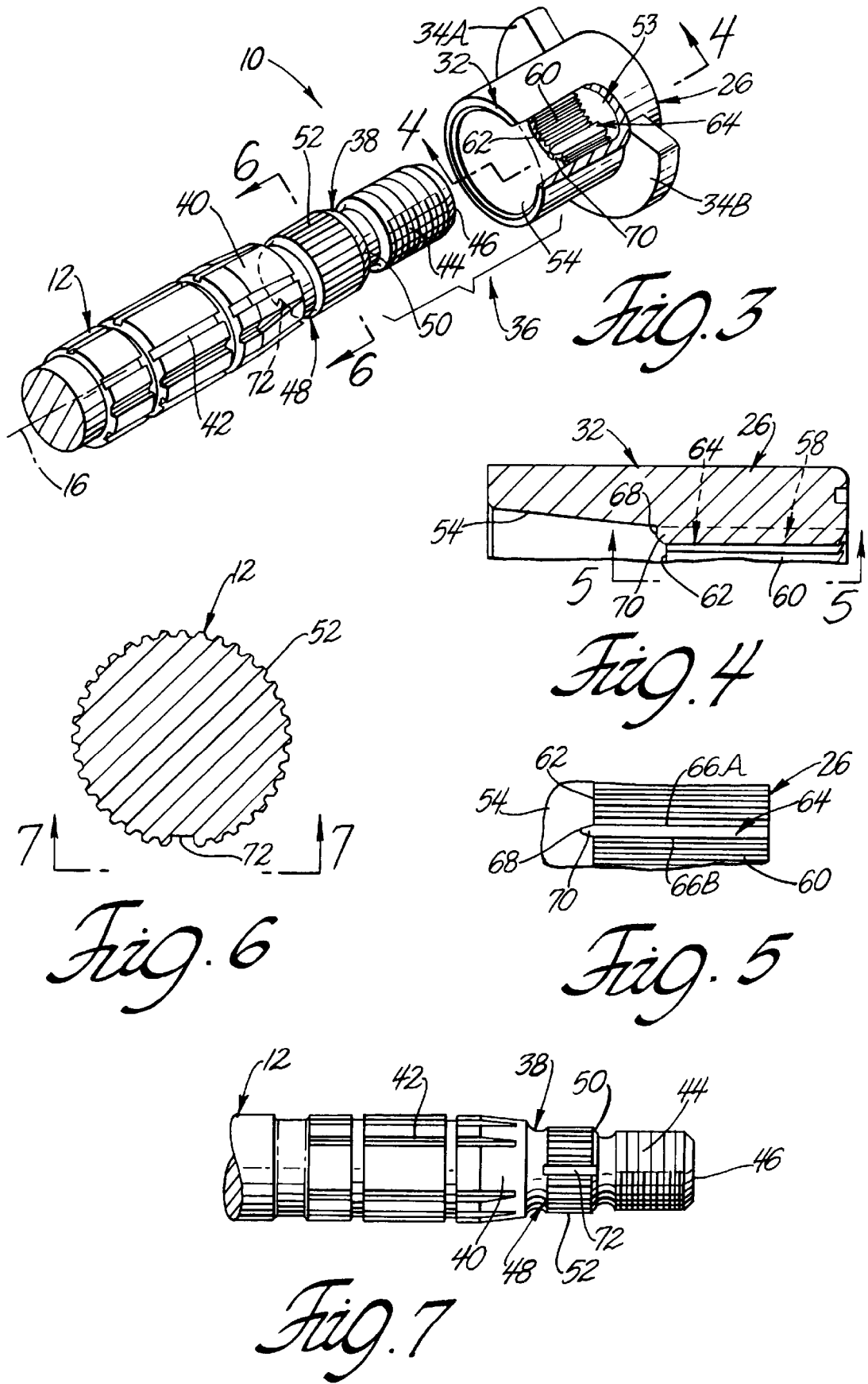

STEERING COLUMN FOR MOTOR VEHICLE

TECHNICAL FIELD

This invention relates to a motor vehicle steering column.

BACKGROUND OF THE INVENTION

A typical motor vehicle steering column includes a steering shaft rotatably supported on a stationary structural housing of the steering column, a steering hand wheel, and an attachment which rigidly couples the steering shaft and the steering hand wheel for unitary rotation about a longitudinal centerline of the steering shaft. The attachment commonly includes a cone-shaped outside shoulder on the steering shaft, a cone-shaped inside shoulder in a bore in a hub of the steering hand wheel, and a retaining nut on the steering shaft outboard of the hub. Screw threads on the retaining nut and on the steering shaft convert rotation of the retaining nut into linear thrust which forces the cone-shaped inside and outside shoulders together in a locking taper fit. In some applications, the integrity of the locking taper fit is enhanced by longitudinal outside spline teeth on the steering shaft in mesh with longitudinal inside spline teeth in the bore in the hub of the steering hand wheel. Two of the longitudinal inside spline teeth on the hub are merged into a double-wide "blocked tooth" which meshes with a correspondingly double-wide blocked-tooth groove on the steering shaft to assure a predetermined angular position of the steering hand wheel on the steering shaft. Aligning the blocked tooth with the blocked tooth groove during installation of the steering hand wheel on the steering shaft is a trial and error process slowed down and made more difficult by false partial engagements between the inside and the outside spline teeth.

SUMMARY OF THE INVENTION

This invention is a new and improved motor vehicle steering column including a steering shaft, a steering hand wheel, and an attachment which rigidly couples the steering shaft and the steering hand wheel for unitary rotation about a longitudinal centerline of the steering shaft. The attachment includes a cone-shaped outside shoulder on the steering shaft, a cone-shaped inside shoulder in a bore in a hub of the steering hand wheel, a retaining nut on a screw thread on the steering shaft outboard of the hub, and a plurality of outside spline teeth on the steering shaft in mesh with a plurality of inside spline teeth in the bore in the hub of the steering hand wheel. Two of the inside spline teeth are merged to define a double-wide blocked tooth on the hub. One of the outside spline teeth is eliminated to define a substantially double-wide blocked tooth groove on the steering shaft. The blocked tooth has a lip extending beyond the ends of the remainder of the longitudinal inside spline teeth which seats on and slides over the ends of the outside spline teeth on the steering shaft until the blocked tooth registers with the blocked tooth groove. The lip on the blocked tooth separates the ends of the inside and the outside spline teeth until the blocked tooth is aligned with the blocked tooth groove thereby to eliminate false partial engagements between the inside and the outside spline teeth as the steering hand wheel is rotated to a predetermined angular position on the steering shaft defined by the blocked tooth groove.

BRIEF DESCRIPTION OF THE DRAWINGS

FIG. 3 is a fragmentary exploded perspective view of the motor vehicle steering column according to this invention;

FIG. 4 is a sectional view taken generally along the plane indicated by lines 4—4 in FIG. 3;

FIG. 5 is a sectional view taken generally along the plane indicated by lines 5—5 in FIG. 4;

FIG. 6 is a sectional view taken generally along the plane indicated by lines 6—6 in FIG. 3; and FIG. 7 is a view taken generally along the plane indicated by lines 7—7 in FIG. 6.

DESCRIPTION OF THE PREFERRED EMBODIMENT

Figure 1:
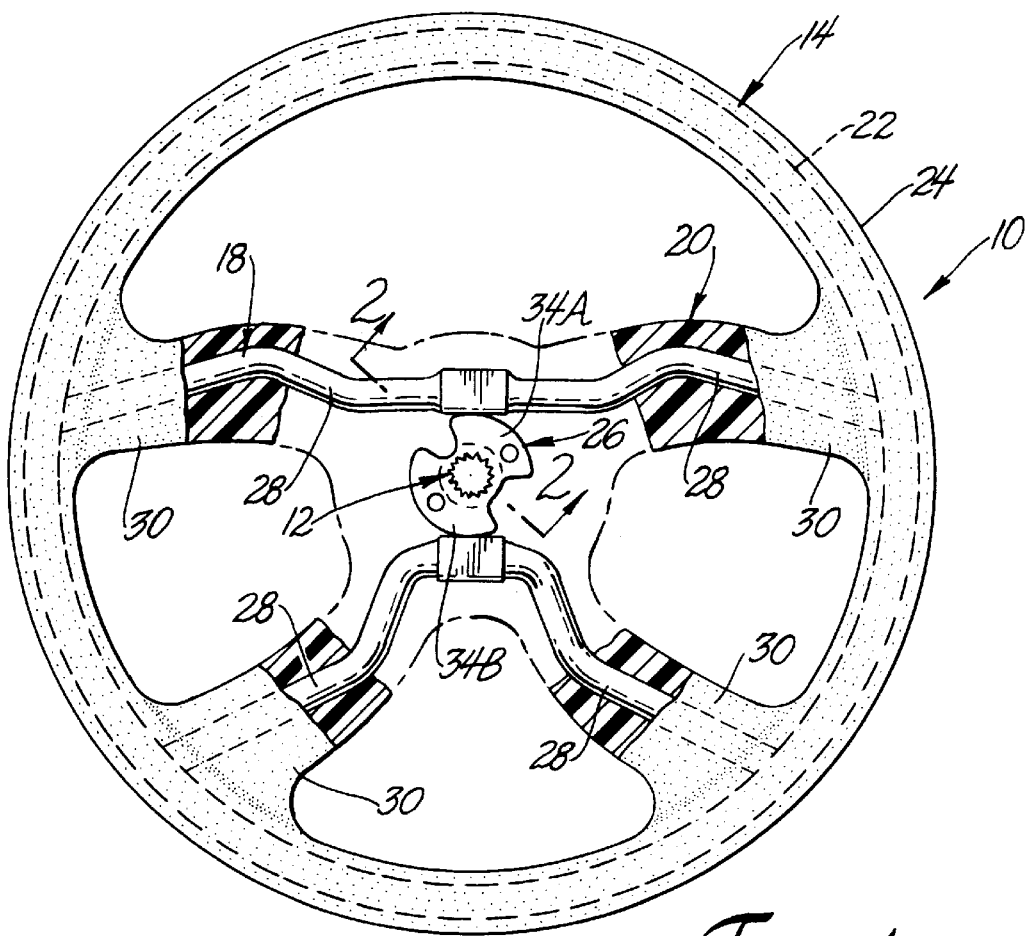
FIG. 1 is a partially broken-away end view of a motor vehicle steering column according to this invention in the direction of a longitudinal centerline of the steering column.

Referring to FIG. 1, a fragmentarily illustrated motor vehicle steering column 10 according to this invention includes a steering shaft 12 and a steering hand wheel 14. The steering shaft 12 is supported on a structural housing, not shown, of the steering column 10 for rotation about a longitudinal centerline 16 of the steering shaft 12. The structural housing is rigidly attached to a body, not shown, of the motor vehicle.

The steering hand wheel 14 includes a rigid insert 18 and a plastic foam cushion 20 molded over the insert. The insert 18 includes a circular rim 22 covered by a rim portion 24 of the foam cushion 20, a center element or hub 26 in the middle of the rim 22, and a plurality of spokes 28 covered by a plurality of spoke portions 30 of the foam cushion 20. The hub 26 has a tubular body 32 and a pair of lateral flanges 34A,34B integral with the tubular body 32. The spokes 28 are rigidly connected to the flanges 34A,34B of the hub 26 as described in U.S. Pat. No. 5,398,568, issued Mar. 21, 1995 and assigned to the assignee of this invention. An attachment 36 rigidly couples the hub 26 and the steering shaft 12 so that the steering hand wheel 14 and the steering shaft 12 are rotatable as a unit about the longitudinal centerline 16 of the steering shaft 12.

As seen best in FIGS. 2–7, the attachment 36 includes a cylindrical stem 38 on the steering shaft 12 and a cone-shaped outside shoulder 40 on the steering shaft inboard of the cylindrical stem 38. The cone-shaped outside shoulder 40 is interrupted by a plurality of grooves 42 parallel to the longitudinal centerline of the steering shaft 12. The cylindrical stem 38 has an outside screw thread 44 at a distal end 46 of the steering shaft and an outside annular boss 48 between the cone-shaped outside shoulder 40 and the outside screw thread 44. The outside boss 48 has an annular shoulder 50 around the stem 38 and is interrupted by grooves defining a plurality of outside spline teeth 52 parallel to the longitudinal centerline 16. The outside shoulder 50 defines an outboard end of each of the outside spline teeth 52.

An outward flaring skirt portion of a bore 53 in the hub 26 defines a cone-shaped inside shoulder 54 on the hub adjacent to an inside annular boss 58 in the bore 53. The annular boss 58 is interrupted by linear grooves defining a plurality of inside spline teeth 60 on the hub 26. An annular shoulder 62 on the inside boss 58 defines an inboard end of each of the inside spline teeth 60.

As seen best in FIGS. 3–5, two of the inside spline teeth 60 are merged together to constitute a substantially double-wide blocked tooth 64 on the hub 26 having a pair of parallel flanks 66A,66B. The blocked tooth 64 has an inboard end 68 beyond the annular shoulder 62 of the inside boss 58. The portion of the blocked tooth 64 between the inboard end 68 thereof and the annular shoulder 62 constitutes a lip 70 of the blocked tooth 64. The flanks 66A,66B of the blocked tooth 64 converge beyond the annular shoulder 62 so that the lip 70 is tapered. As seen best in FIGS. 6–7, one of the longitudinal outside spline teeth 52 at a predetermined angular position on the steering shaft 12 is eliminated to define on the steering shaft 12 a double-wide blocked tooth groove 72 the width of which is substantially the same as the width of the blocked tooth 64.

In assembling the steering hand wheel 14 on the steering shaft 12, the bore 53 in the hub 26 is fitted over the distal end 46 of the steering shaft 12 and the hub 26 is translated linearly toward the cone-shaped outside shoulder 40. The annular shoulders 50,62 on the outside and the inside bosses 48,58 radially overlap each other so that before the cone-shaped outside and inside shoulders 40,54 engage, the inboard end 68 of the blocked tooth 64 seats against the annular shoulder 50 on the outside boss 48 and cooperates therewith in separating the outboard ends of the outside spline teeth 52 from the inboard ends of the inside spline teeth 60 in the direction of the longitudinal centerline 16 of the steering shaft 12.

With the inboard end 68 of the blocked tooth 64 bearing against the shoulder 50 on the annular boss 48 on the steering shaft 12, the steering hand wheel 14 and the hub 26 are rotated relative to the steering shaft 12 about the longitudinal centerline 16 of the latter. The inboard end 68 of the blocked tooth 64 always spans the outboard ends of two of the outside spline teeth 52 so that the annular shoulder 50 effectively defines a platform over which the lip 70 of the blocked tooth 64 slides as the steering hand wheel 14 and the hub 26 rotate relative to the steering shaft 12. When the blocked tooth 64 attains registry with the blocked tooth groove 72, the lip 70 slides substantially effortlessly into the blocked tooth groove 72 to capture the angular position of the steering hand wheel 14 relative to the steering shaft 12 with the inside spline teeth 60 aligned with the grooves between the outside spline teeth 52 and vice versa.

Figure 2:
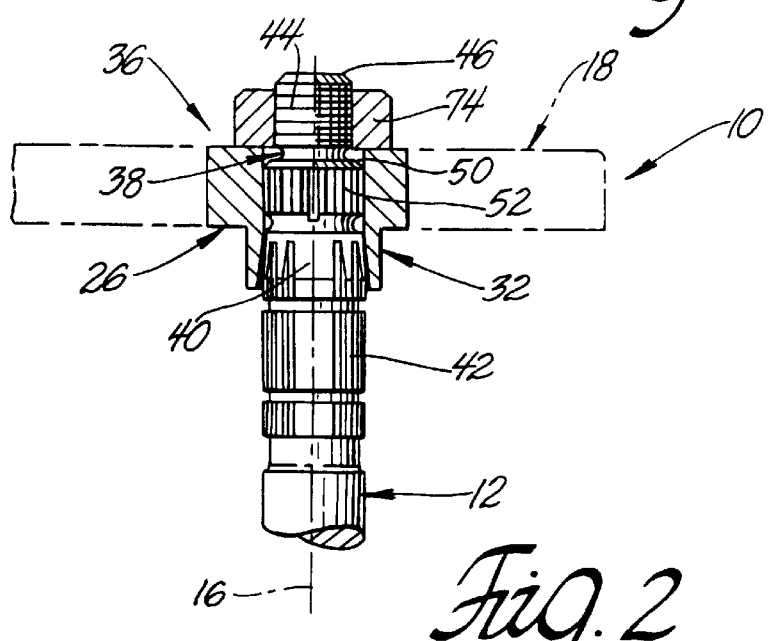
FIG. 2 is a fragmentary enlarged sectional view taken generally along the plane indicated by lines 2—2 in FIG. 1.

The hub 26 then commences liner translation in the direction of the longitudinal centerline 16 of the steering shaft 12 until the cone-shaped inside shoulder 54 seats against the cone-shaped outside shoulder 40. At the same time, the outside spline teeth 52 mesh longitudinally with the inside spline teeth 60. A nut 74, FIG. 2, is then screwed onto the outside screw thread 44 on the steering shaft outboard of the hub 26 and rotated to thrust the cone-shaped inside and outside shoulders 54, 40 together in the aforesaid locking taper fit. The nut 74 prevents dislodgment of the steering hand wheel 14 from the distal end 46 of the steering shaft 12. The locking taper fit between the cone-shaped inside and outside shoulders 54, 40 eliminates lash between the steering shaft 12 and the hub 26 which would otherwise manifest itself as relative rotation and/or relative linear translation between the steering shaft 12 and the steering hand wheel 14.

The lip 70 on the blocked tooth 64 is an important feature of the this invention which simplifies the installation of the steering hand wheel 14 on the steering shaft 12. That is, by keeping separate the outboard ends of the outside spline teeth 52 and the inboard ends of the inside spline teeth 60 until the blocked tooth 64 is aligned with the blocked tooth groove 72, the false partial engagements between the inside and the outside spline teeth characteristic of the prior trial and error method of aligning the blocked tooth 64 with the blocked tooth groove 72 are eliminated.

Having thus described this invention, what is claimed is:

1. In a motor vehicle steering column including a steering shaft, an outside annular boss on said steering shaft having an outboard annular shoulder at an end thereof and a plurality of linear grooves therein defining a plurality of outside spline teeth each having an outboard end at said outboard annular shoulder, a steering hand wheel, a hub means on said steering hand wheel having a bore therein around said steering shaft, an inside annular boss on said hub means in said bore therein having an inboard annular shoulder at an end thereof radially overlapping said outboard annular shoulder of said outside annular boss and a plurality of linear grooves therein defining a plurality of inside spline teeth each having an inboard end at said inboard annular shoulder, a blocked tooth on said inside annular boss wider than each of said inside spline teeth, and a blocked tooth groove on said outside annular boss having a width corresponding to the width of said blocked tooth, said inside spline teeth and said outside spline teeth being aligned for longitudinal mesh with each other when said blocked tooth and said blocked tooth groove are aligned for longitudinal mesh with each other, the improvement comprising, a lip on said blocked tooth extending beyond said inboard annular shoulder on said inside annular boss slidably engageable on said outboard annular shoulder on said outside annular boss to maintain separation between said inboard ends of said inside spline teeth and said outboard ends of said outside spline teeth until said blocked tooth is aligned with said blocked tooth groove.

2. The steering column recited in claim 1 further comprising:

a pair of tapered sides on said lip on said blocked tooth.

* * * * *